No. 761,210. PATENTED MAY 31, 1904.
F. H. COTTRILL.
PRINTING MACHINE.
APPLICATION FILED MAY 5, 1902.
NO MODEL. 6 SHEETS—SHEET 4.
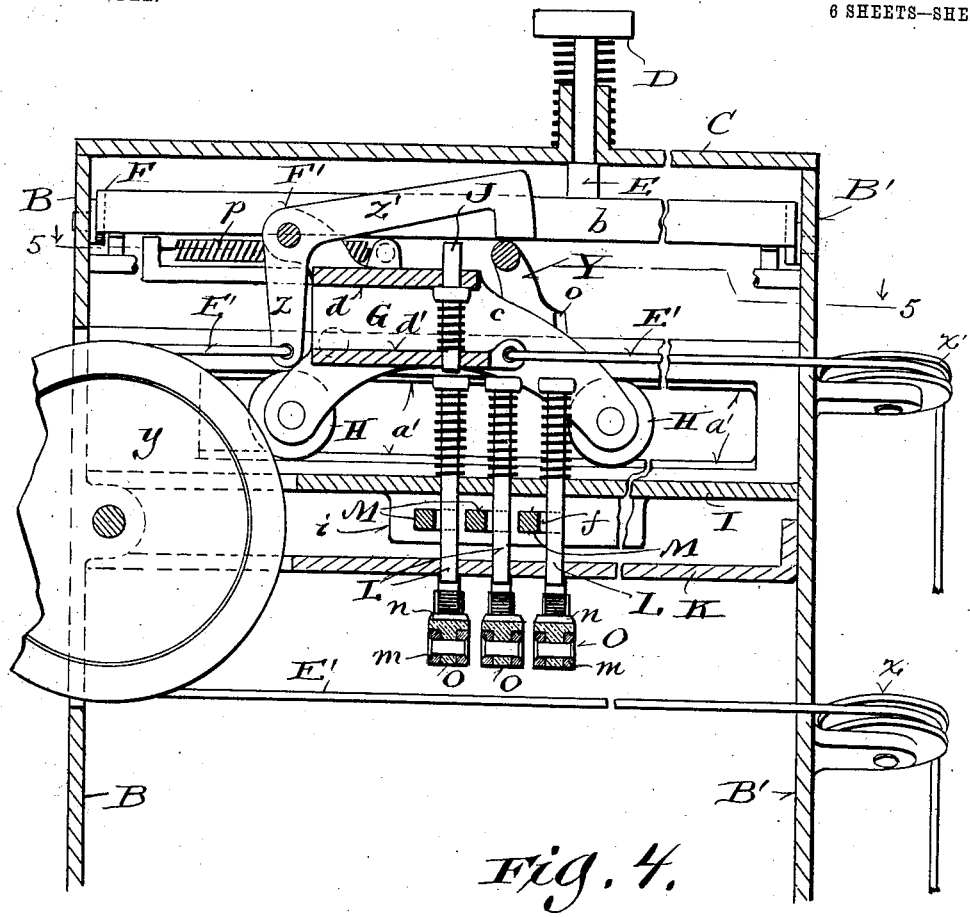
Fig. 4.
Fig. 9.
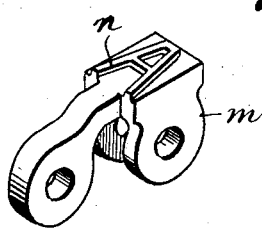
Witnesses:
Geo. W. Young
Jas. A. Rigby
Inventor:
Frank H. Cottrill
By Livingston A. Thompson
Attorneys

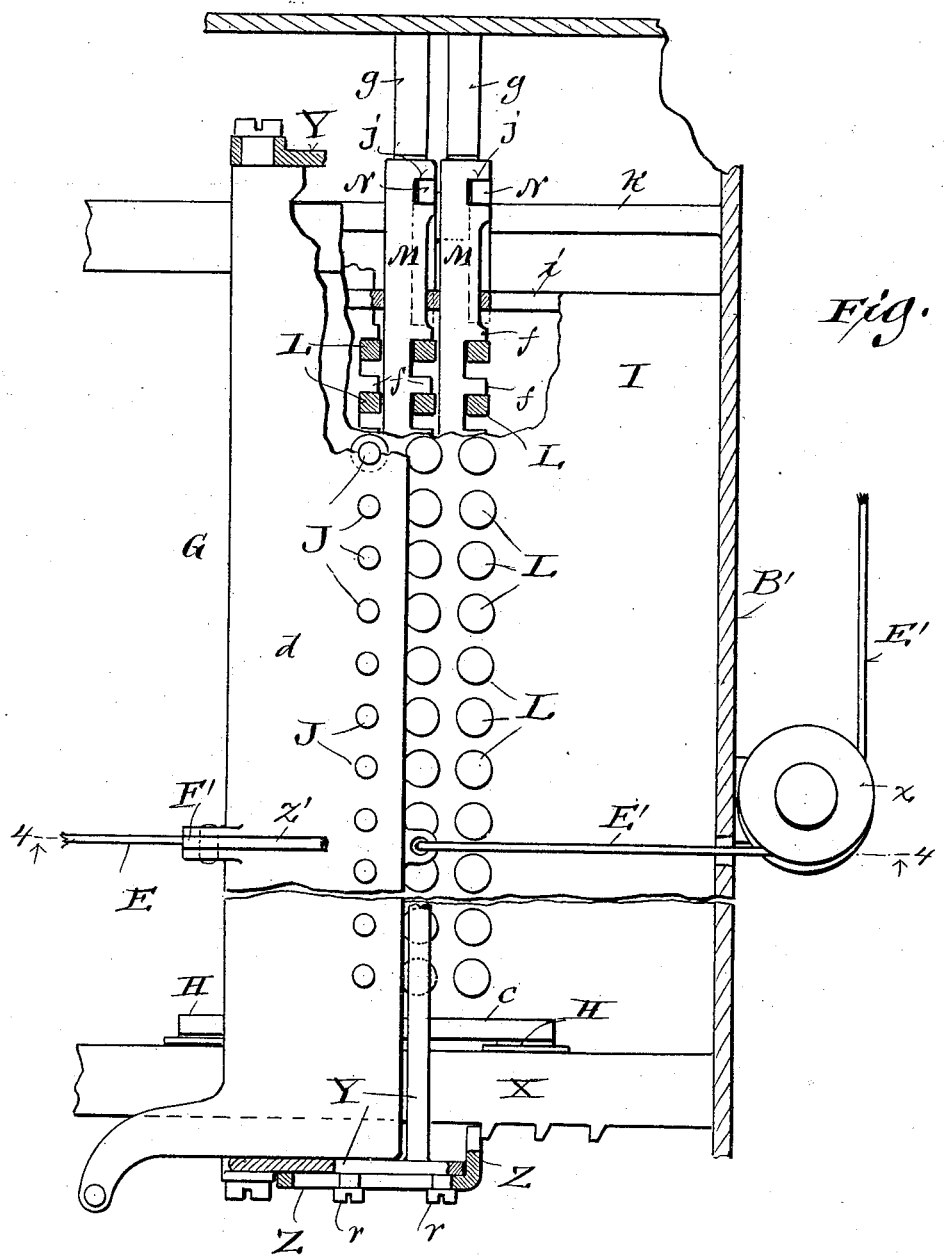

No. 761,210. PATENTED MAY 31, 1904.
F. H. COTTRILL.
PRINTING MACHINE.
APPLICATION FILED MAY 5, 1902.
NO MODEL.
6 SHEETS—SHEET 6.
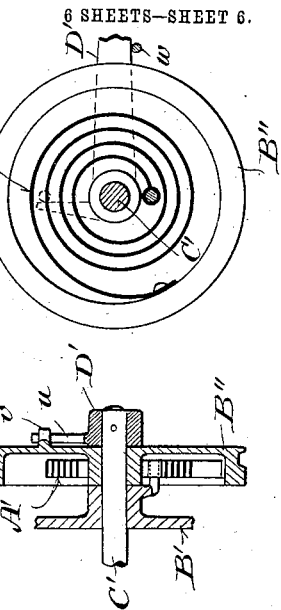
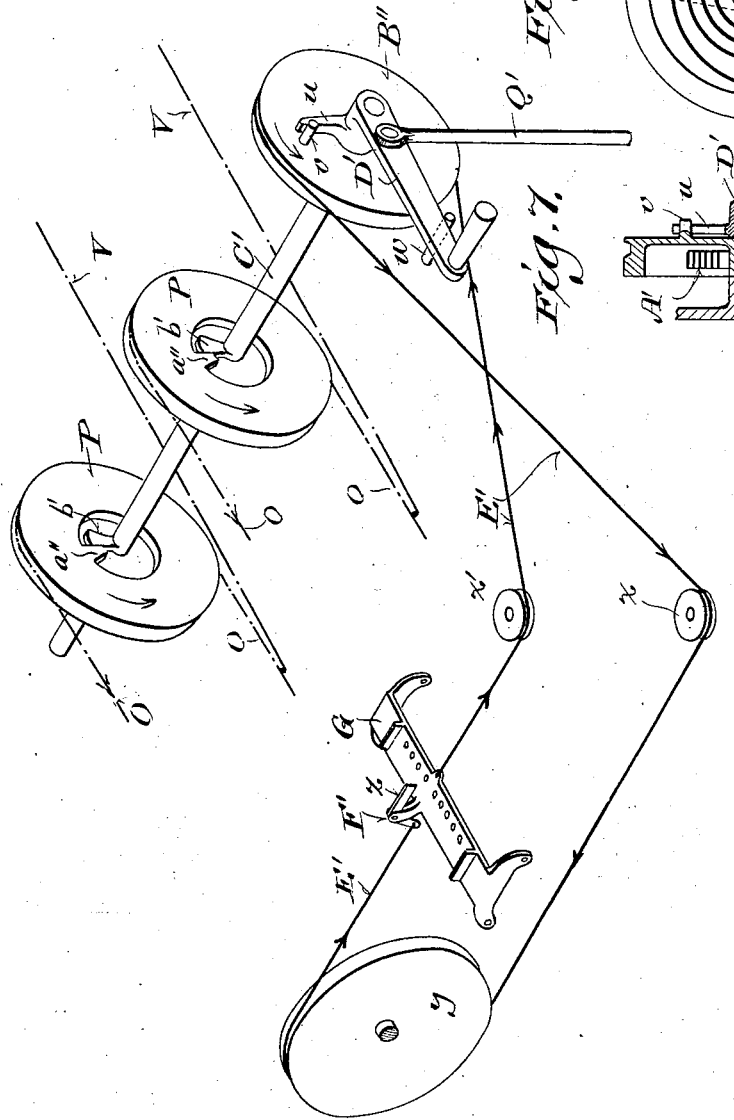

No. 761,210. Patented May 31, 1904.

UNITED STATES PATENT OFFICE.

FRANK H. COTTRILL, OF MILWAUKEE, WISCONSIN, ASSIGNOR TO AMERICAN CHECK PRINTING MACHINE COMPANY, A CORPORATION OF WISCONSIN.

PRINTING-MACHINE.

SPECIFICATION forming part of Letters Patent No. 761,210, dated May 31, 1904.

Application filed May 5, 1902. Serial No. 105,924. (No model.)

*To all whom it may concern:*

Be it known that I, FRANK H. COTTRILL, a citizen of the United States, and a resident of Milwaukee, in the county of Milwaukee and State of Wisconsin, have invented certain new and useful Improvements in Printing-Machines; and I do hereby declare that the following is a full, clear, and exact description thereof.

My invention has for its object to provide a simple and effective machine which by the manipulation of a series of keys will bring to a common point or line a series of characters corresponding to the keys and lock the same; and it consists in certain peculiarities of construction and combination of parts to be fully set forth hereinafter, with reference to the accompanying drawings, and subsequently claimed.

Figure 1:
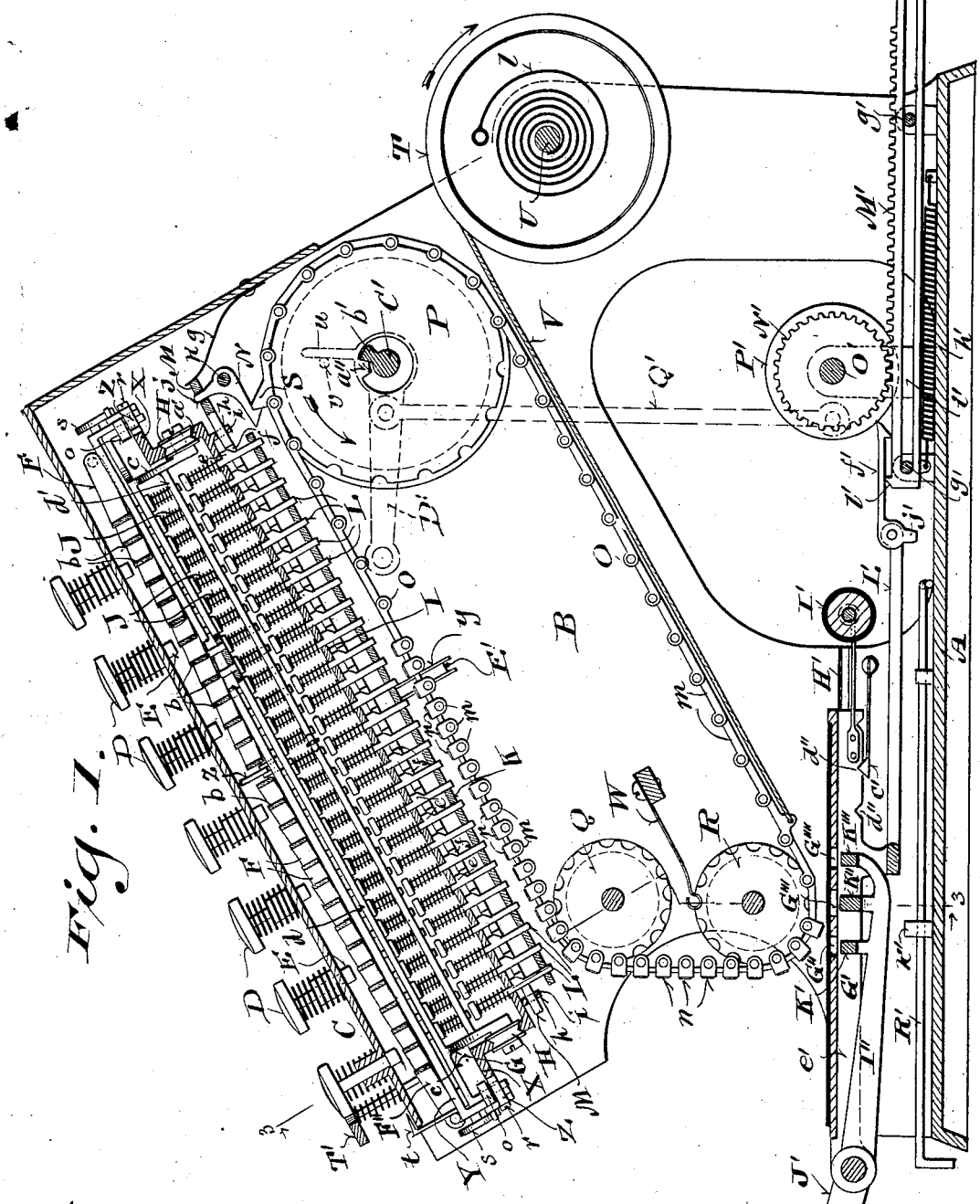
Figure 2:
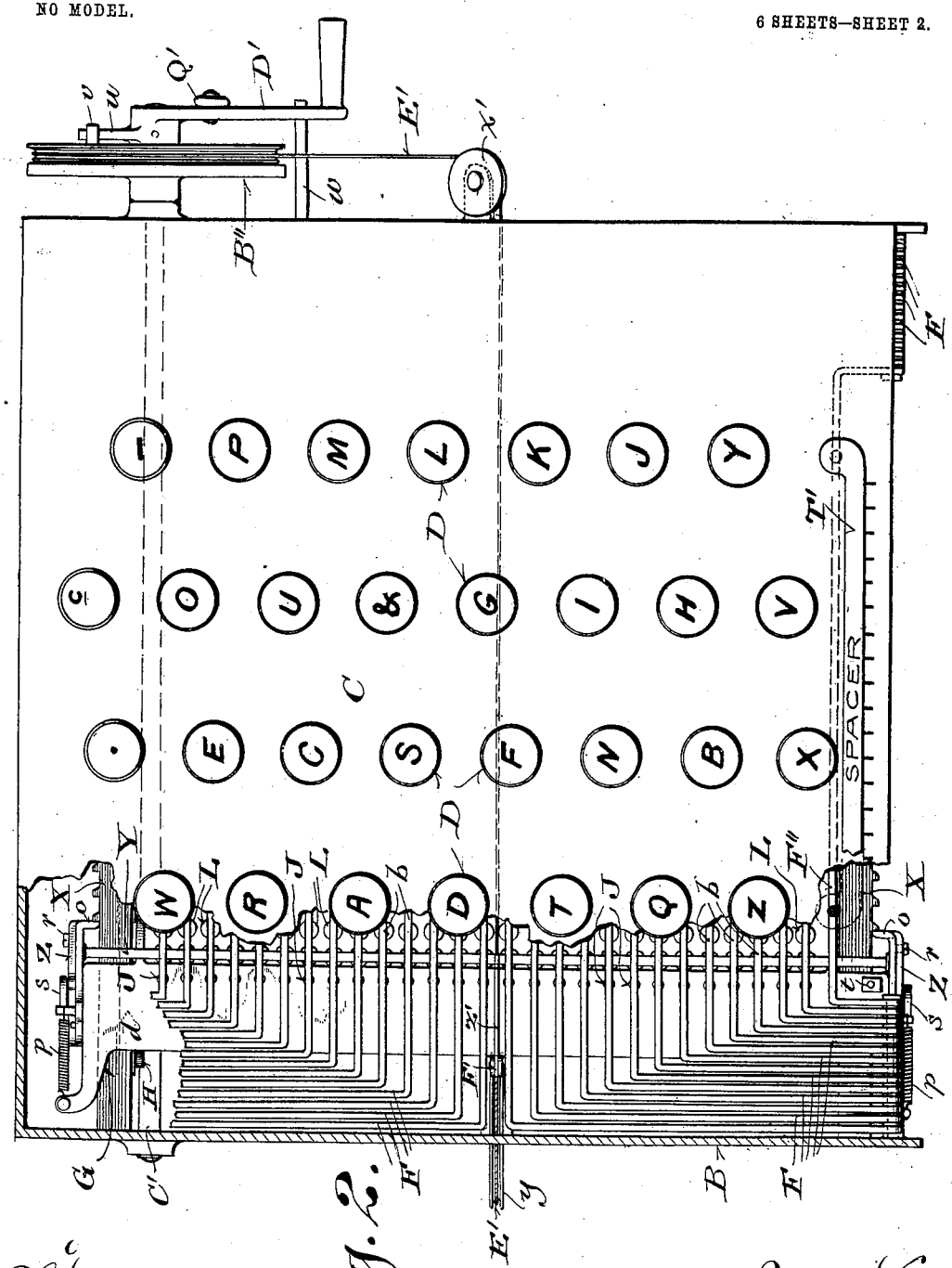
Figure 3:
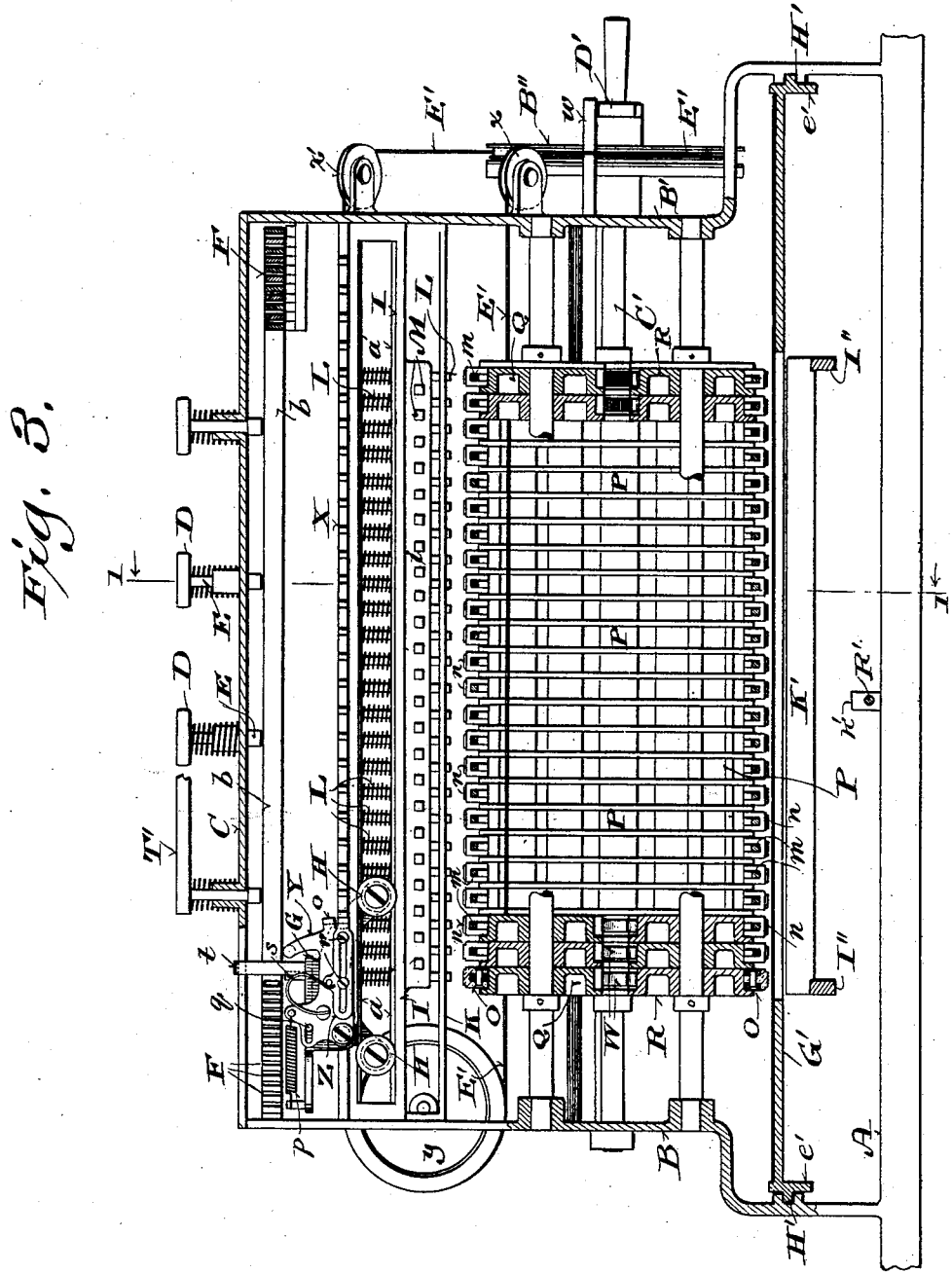

In the drawings, Figure 1 is a cross-section through the machine indicated on line 1 1 of Fig. 3. Fig. 2 is a plan view of the same with parts broken away and in section to better illustrate my invention. Fig. 3 is a front elevation, partly in section, as indicated by line 3 3 of Fig. 1. Fig. 4 is an enlarged detail section of the type-actuating mechanism indicated on line 4 4 of Fig. 5. Fig. 5 is a plan view of that portion of the machine shown in Fig. 4 and partly in section as indicated by line 5 5 of Fig. 4. Fig. 6 is a diagram view of the type and carriage recover mechanism. Figs. 7 and 8 are detail sections of the spring-drum of the carriage. Fig. 9 is a detail perspective view of one of the type-links.

Referring by letters to the drawings, A is a base having standards B B' projecting therefrom, and upon the latter is secured a keyboard C, which has mounted thereon a series of spring-controlled keys D, and, as illustrated, there are thirty in number, twenty-six for the alphabet and the remainder designating a dash, small "c," (to be used in printing surnames, such as McLeod, &c.,) period, and the character "&." The arrangement and number of keys, however, may be varied indefinitely, it being desired to so group the characters as to bring those most used as near the center of the keyboard as possible. The keys D have depending pins E projecting through the keyboard for engagement with a corresponding series of yokes F. Pivoted to the standards B and B' and beneath the aforesaid yokes is mounted a traveling carriage G, the rollers H of which are guided in slots $a$ and $a'$ in the upturned edges of a table I. The said carriage is arranged to travel lengthwise of the connecting-bars $b$ of the yokes F and, as shown, is formed with upright side pieces $c$ and $c$, upon which the rollers are pivoted, the side pieces being connected by parallel strips $d$ and $d'$. The carriage G has a line of spring-plungers J at right angles to the travel of the former. These plungers are mounted in the strips $d$ and $d'$ of the carriage and are so disposed as to be directly under the bars $b$ of the yokes F and correspond in number to the keys D.

The table I, together with a plate K, which is also secured to the standard B and B', is provided with perforations for the reception of a series of lines of spring-controlled locking plugs or stops L, each line registering with the line of plungers J of the carriage when the latter is allowed forward movement by its escapement. The locking-plugs beneath the table I have beveled lugs $e$, which oppose corresponding beveled teeth $f$, projecting from releasing-bars M, and are normally held against the plugs or stops L by springs $g$. The releasing-bars M are guided by slots $h$ in ribs $i$, depending from the table I, there being one bar for each line of locking-plugs, and at the inner ends of the bars apertures $j$ are provided for engagement with the tails of a series of pawls N, pivoted upon a rod $k$. A series of endless belts or chains O are arranged to travel directly under the locking-plugs L upon sheaves P at the back of the machine and smaller sheaves Q and R at the front. Each belt is composed of a series of links $m$, a number of which are provided with raised characters or type $n$, corresponding to those designated upon the keys D, said characters or type being duplicated upon each of the belts and constituting the ordinary "font." A lug S extends upward from one link in each belt above the characters $n$ and in the path of the pawl N, the purpose of which will be fully set forth hereinafter. A number of independent spring-drums T are loosely mounted upon a shaft U at the back of the machine, the springs $l$ of which are secured to the aforesaid shaft U at one end and to the drums at the other end, and connecting said drums and chain belts are flexible cords V. The spring-drums being under tension will when their respective chains are released impart motion to the latter. The sheaves of the belts, as shown, are corrugated upon their peripheries to prevent slipping of the belts upon them. The lower front sheaves R, beneath which is the printing-point, are also provided with spring-detents W, which engage the corrugated faces of the sheaves R and insure perfect alinement of the type at the printing-point.

Just above the slots $a$ $a'$ in the upturned edges of the table I and projecting therefrom are racks X, into which an escapement mechanism operates to allow the carriage to move forward one space or the distance between centers of the lines of locking-plugs L. The aforesaid mechanism primarily consists of a bail Y, pivoted to the sides $c$ of the carriage, having inturned fingers $o$ normally out of engagement but in line with the rack X. A spring $p$, secured to the bail Y and the carriage-frame, holds the former in this position against a stop $q$. A slip-dog Z, which is secured to the bail Y by means of screws $r$, passing through slots in the former, is normally in toothed engagement with the rack X and prevents forward movement of the carriage until the bail Y is depressed, when it disengages the rack and is forced forward one space by a delicate spring $s$, while in the meantime the finger $o$ of bail Y engages the rack-tooth and holds the carriage until the bail again rocks back, causing the dog Z to engage a fresh tooth, and at the same time the carriage-feed power will overcome the tension of the spring $s$ and it will travel forward one tooth.

While I have shown and described the above mechanism for operating my carriage step by step, I do not wish it to be understood that I desire to claim or limit my invention to this particular form of escapement, as any well-known mechanism for this purpose may be utilized.

The carriage G at its front is provided with a pointer $t$, the end of which travels over a scale upon the keyboard C and shows the operator the exact position of the carriage and also the number of type characters or spaces the latter has moved.

The power for feeding the carriage is obtained by a spiral spring A', secured to the standard B' at one end and a drum B'' at the other end, the latter being loosely mounted upon the shaft C', upon which also turns the sheaves P. Said shaft C' has its bearings in the standards B and B' and projects beyond the drum B'' far enough to receive a crank D', that is made fast to said shaft. The aforesaid crank has a finger $u$ in the path of a pin $v$ on the drum B'', and when the machine is at rest this pin is against the finger $u$, and the crank rests upon a stop $w$, projecting out from the standard B', as best illustrated in Fig. 6 of the drawings. The face of the spring-drum B'' is grooved for the reception of a belt or cable E', which is crossed and passes over idle pulleys $x$ $x'$, by means of which it makes a right-angle turn. The end of the cable which passes over the upper pulley $x'$ is connected directly to the carriage G, while the other end runs entirely across the machine and over a large pulley $y$ and is connected to one arm $z$ of a bell-crank lever F', pivoted in ears upon the carriage, the arm $z'$ of which is directly over the bail Y of the escapement mechanism. By the above arrangement it may be seen that when the carriage G is released by the escapement spring-drum B'' will revolve loosely upon the shaft C', causing the cable to move in the direction of the arrows indicated in the diagram Fig. 6 and pull the carriage forward without materially affecting the bell-crank lever F'; but when it is desired to return the carriage the cable is drawn in the reverse direction and will immediately rock the lever F', which in turn presses the bail Y entirely out of engagement with the rack X, thereby freeing the carriage from the same and permitting it to be drawn back. This movement at the same time winds the spring A' simultaneously with the drums T and brings all the chains O back to their normal position in the following manner:

When the machine is in operation, the drums T, together with sheaves P and drum B'', move in the direction indicated by the arrows in Figs. 1 and 6. The sheaves P, which are nested together, are provided with annular recesses at their hubs and formed with teeth $a''$, which normally rest against lugs $b'$ of the shaft C', and when any one of the chains is released its spring-drum T will cause the former to move, thereby rotating its sheave P a predetermined distance. This carries the tooth $a''$ away from the lug $b'$, and a similar operation takes place when the carriage is moved by the drum B'' with relation to the pin $v$ and finger $u$ of the crank D'. To reset the machine, it is only necessary to rock the crank D' by hand in the reverse direction, which will cause the finger $u$ and lugs $b'$ upon shaft C' to pick up and carry back all the drums and sheaves that have been operated, the crank D' in its movement making almost a complete revolution, it being limited by coming against the stop $w$. All the springs are now wound and the parts are in position.

The crank D' is then reversed and brought to rest in the position illustrated in Fig. 6, the lugs b' and finger u being back of the teeth a' and pin v.

For the purpose of obtaining an impression of the characters brought to the printing-point I have shown a sliding bed G', which reciprocates in grooves H' in the standards B and B', and to the inner end of this bed is attached an inking-roller I', while at the front is provided a lever J', having arms I'', connected by printing-strips or anvils K' K'' K''', one of which is directly under the printing-point when the bed is in position, and slots G'' G''' G'''' are cut out of the bed G' in line with the several anvils, and when it is desired to print the bed is pulled out to facilitate adjusting the paper thereon and then pushed under the type in the position as illustrated in Fig. 1 of the drawings, where it is held by a detent c', which engages any one of three notches d'' in a flange e' of the bed G'. These notches are spaced to correspond to the distance between the anvils and are for the purpose of centering the bed to print more than one line by moving the bed G' backward or forward and bringing into play a different anvil under the printing-point, which anvil is then forced against the face of the type and embosses and prints the characters upon the paper. The bed and printing arrangement, however, may be varied, or I may dispense with it entirely and make a mold of the characters brought in line. It is obvious that after I have set up a line of type I may take as many impressions as desired by pulling out the bed G' and inserting another blank thereon, and in this case I would not wish to disturb the line of type or recover the machine to normal until the required number of duplicates had been made; but ordinarily it will be necessary to reset the machine after each impression is obtained, and with this in view and in order that the least number of motions may be made by the operator to manipulate the device, and thus increase the speed, I have illustrated a mechanism connected to the bed G' whereby when the latter is drawn out by the operator the entire machine will be restored to its normal position by the foregoing arrangement. The bar L' forms a part of the bed G' and carries a pawl f' for engagement with a rack M'. Said rack reciprocates upon guide-rods g' and is held in its position of rest by a spring h'. A gear-wheel N' is fast on a shaft O', that is trunnioned in ears I', projecting from the base of the machine, and fast to the other end of the shaft is a crank-disk P'. The latter is connected by a pitman Q' to the crank D'. The pawl f' has a depending tailpiece j'', and when it is desired to withdraw the bed G' without disturbing the machine a trip-rod R', which may be rocked in its bearing under the bed G' and also reciprocated, is pushed against the tailpiece of pawl f'. This disengages the latter from a tooth l', which it normally engages, and thereby frees the bed G' from the restoring mechanism; but if the trip-rod is not operated it is obvious that the pawl f' will pull the rack forward, thereby rotating the gear and crank-disk P', which through its pitman Q' will operate the hand-crank D' and restore the parts, as previously described. The tailpiece j'' of the pawl f' will now strike the bearing-block k' of the trip-rod and release the rack. The spring h' will cause the latter to slide back and bring the crank D' to its position of rest, as indicated in dotted lines in Fig. 1 and in full lines in Fig. 6.

The operation of the keys to put in motion and arrest the desired type upon the chains at a common line or printing-point is as follows: When a key is depressed, it rocks its yoke F, which in turn forces its corresponding plunger J of the carriage, together with the bail Y of the escapement, downward. The plunger J in turn depresses the plug L. The downward movement of the latter by means of its beveled lugs e engaging a tooth f of a releasing-bar M slides the same back and raises its pawl N clear of the lug S on the chain O. The chain immediately moves forward, and the bar M is returned to its normal position through the spring g, tooth f of which snaps over the lug e of the plug L, that was previously depressed, and locks the same in this position, so that the operator will not be compelled to await the final stoppage of the desired type, which will be accomplished when the lug S strikes the end of the locking-plug L, but he may continue to operate the keys as fast as possible until the entire line of chains, with their type, have been put in motion, the effect being that with each depression of a key the carriage will move forward to the next line of plugs L, over which the plungers of the carriage register, or if a space is required the spacing-bar T', which is connected to a yoke F'' at the front of the machine, is depressed. This will simply operate the escapement-bail Y of the carriage and cause the latter to move forward one space without releasing a chain belt.

It will be understood that the number of characters upon each belt or the number of belts is immaterial and that the characters may be either male or female; but each belt must have a row of locking-plugs above it equal to the number of characters thereon and one row of plungers carried by the carriage to register with and equal in number to a single row of the locking-plugs and with a yoke for each type character extending across the entire travel of the carriage. It is obvious that no matter at what position the latter may be with relation to one of the stationary keys the yoke when rocked will impart motion to the escapement and locking plug or stop. These features I consider an important part of my invention, as it enables me within a limited space to produce a machine which is capable of printing a line of characters or words with speed and accuracy and holding the line intact until it is desired to dispense the latter, which can be done by either withdrawing the bed upon which the printing material is placed or independent thereof.

Having thus described my invention, what I claim as new, and desire to secure by Letters Patent, is—

1. In a printing-machine a plurality of carriers having a series of type duplicated thereon, means for imparting independent motion to the latter, a carriage disposed above said carriers and adapted to be moved step by step at a right angle to the travel of the aforesaid carriers, and a series of plungers arranged upon the carriage, a series of plugs interposed between the latter and the carriers, whereby said carriers are set in motion and checked at a predetermined point substantially as set forth.

2. In a printing-machine a plurality of carriers having a series of type duplicated thereon, a single series of keys representing the type upon the carriers, stops located adjacent to the carriers equal in number to the type thereon, a carriage provided with an escapement and arranged to travel over the stops and having a series of plungers corresponding in number to the keys, a series of yokes interposed between the latter and the aforesaid plungers parallel with the travel of the carriage, whereby, when a key is operated it automatically puts in motion one of the carriers to bring its corresponding type character to a common line and release the carriage, causing the latter to move forward one space, substantially as set forth.

3. In a printing-machine a plurality of endless carriers having a series of type duplicated thereon, independent springs for actuating the carriers, a spring-driven carriage arranged to travel at a right angle to the carriers and provided with a series of plungers parallel with the travel of said carriers and a series of stationary plugs arranged beneath the aforesaid plungers, a keyboard above the carriage arranged to actuate the plungers of the carriage substantially as set forth.

4. In a printing-machine a plurality of endless belts having duplicate sets of type thereon, a lug extending above the face of the type and a pawl for engagement therewith, springs arranged to propel the belts, a stop for each type located above the aforesaid belts, means for locking the stops when depressed, releasing mechanism for the pawls connected to the stops, a spring-actuated carriage provided with an escapement mechanism arranged to travel above the stops, plungers carried by the carriage, pivoted yokes for engagement with the plungers whereby the latter are depressed, keys corresponding to a set of type for engagement with the aforesaid yokes whereby the belts are released and the type brought to a common printing-line, a movable printing-bed beneath the printing-line, means connected to the latter whereby the several parts of the machine are brought back to normal when the said printing-bed is withdrawn substantially as set forth.

5. In a printing-machine, a plurality of belts mounted upon sheaves, sets of type duplicated upon each of the belts, spring-drums connected to the latter, means for locking said belts against the action of the spring-drums, a stop for each type, lugs upon the belts for engagement with the stops, a traveling carriage having a set of plungers equal in number to a set of the type, a spring-drum connected with the carriage for actuating the same in one direction and an escapement mechanism mounted upon said carriage, a stationary rack for the escapement, a series of yokes above the carriage arranged to operate the escapement, keys above the yokes for engagement with the same, a reciprocating bed under the belts, mechanism connecting the same with the spring-drums of the belts and carriage, whereby they are wound up when said bed is moved in one direction and means for disengaging said mechanism from the bed at the will of the operator, substantially as set forth.

6. In a printing-machine, a plurality of endless carriers having a series of type duplicated thereon, independent springs for actuating the carriers, a spring-driven carriage arranged to travel at a right angle to the carriers and provided with a series of plungers parallel with the travel of said carriers, a keyboard above the carriage arranged to actuate the plungers of the latter, a removable printing-bed located beneath the endless carriers, and means connecting said bed with the carriers and carriage whereby they are returned to their respective normal positions when the bed is moved in one direction substantially as set forth.

In testimony that I claim the foregoing I have hereunto set my hand, at Milwaukee, in the county of Milwaukee and State of Wisconsin, in the presence of two witnesses.

FRANK H. COTTRILL.

Witnesses:
 JAS. A. RIGBY,
 J. H. WOOD.